Figure 4:
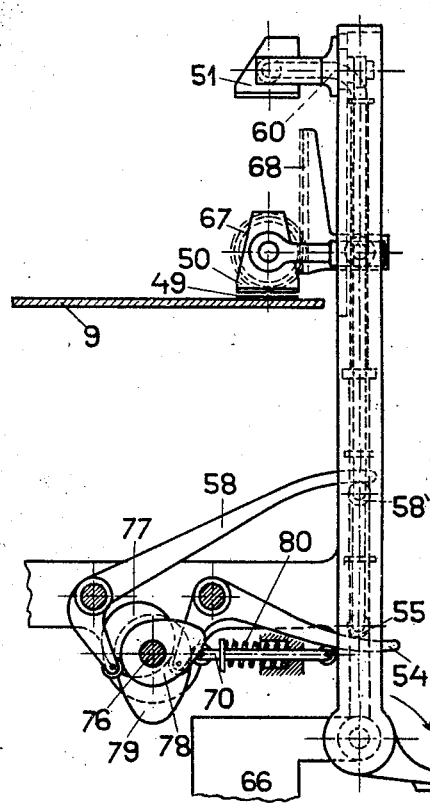

Feb. 16, 1932.   H. DENHOF   1,845,134
PROCESS AND MACHINE FOR UNIFORMLY DISTRIBUTING
IMPREGNATING MEDIUMS ON ARTICLES OF WASHING
Filed Dec. 19, 1927   3 Sheets-Sheet 1
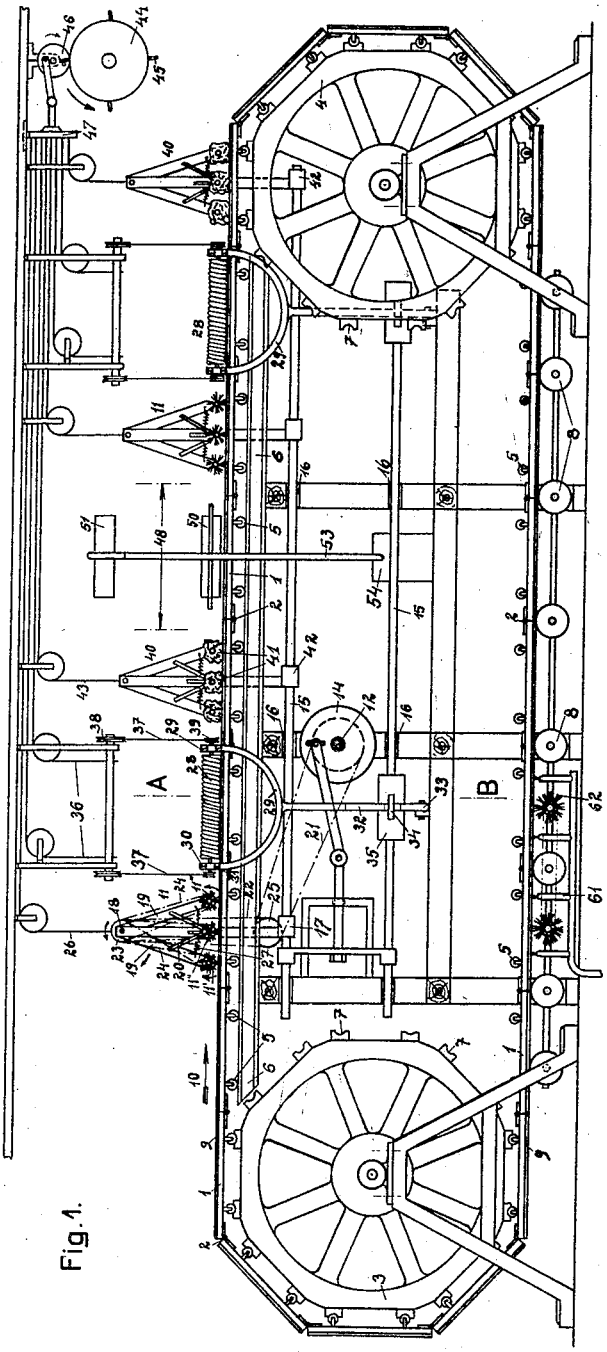
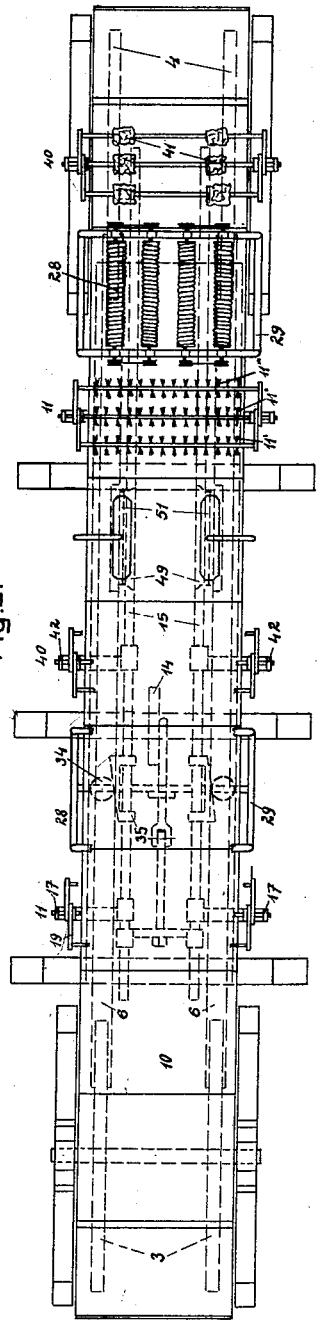
H. Denhof
INVENTOR
By: Marks & Clerk
ATTYS.

Feb. 16, 1932.   H. DENHOF   1,845,134
PROCESS AND MACHINE FOR UNIFORMLY DISTRIBUTING
IMPREGNATING MEDIUMS ON ARTICLES OF WASHING
Filed Dec. 19, 1927   3 Sheets-Sheet 2
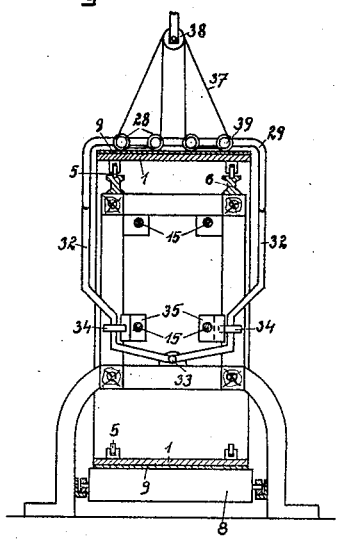
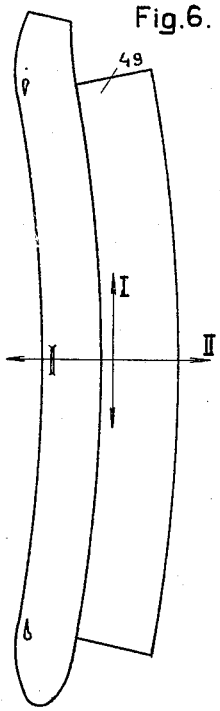
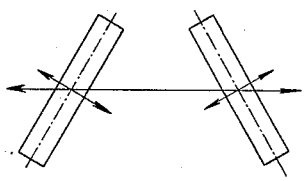
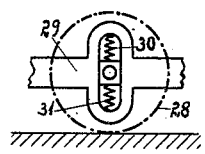
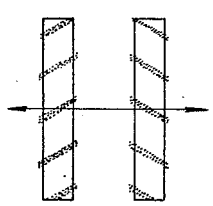

Feb. 16, 1932.   H. DENHOF   1,845,134
PROCESS AND MACHINE FOR UNIFORMLY DISTRIBUTING
IMPREGNATING MEDIUMS ON ARTICLES OF WASHING
Filed Dec. 19, 1927   3 Sheets-Sheet 3

Patented Feb. 16, 1932

1,845,134

UNITED STATES PATENT OFFICE

HANS DENHOF, OF VIENNA, AUSTRIA

PROCESS AND MACHINE FOR UNIFORMLY DISTRIBUTING IMPREGNATING MEDIUMS ON ARTICLES OF WASHING

Application filed December 19, 1927, Serial No. 241,191, and in Austria December 23, 1926.

The present invention relates to a process for ensuring mechanically a uniform distribution and working-in of the impregnating medium such as starch etc. placed on the articles of washing, as well as to an apparatus for carrying the said process into practical effect. It is more particularly useful for starch for producing starched or glazed washing, for instance for collars, cuffs etc.

In the case of articles of washing which are starched in the usual manner, the starch is distributed on the surface of the article in such an irregular manner that in order to obtain perfectly starched articles (for instance collars, cuffs), the process of impregnation has to be followed by a uniform distribution and working in of the starch.

According to this invention, this essential process of distribution is carried out in such a manner that the articles of washing impregnated with the impregnating medium are placed on a smooth support and exposed on the whole of their surface to mechanical treatment by one or more rotating or rocking distributing organs and thereupon exposed to the action of absorbent wiping organs which remove the excess of the impregnating medium from the surface of the articles. This is preferably done by treating the articles simultaneously or consecutively on both surfaces by exposing them in each direction to the action of one or more rotating distributing organs. The directions in which these different treatments take place can be at any desired angle, that is to say, at right angles, to each other and coincide for instance with the direction of length and of width of the article.

The rotating distributing organs are preferably constituted by rotating brushes, for instance by cylindrical brushes, or by elastic distributing pressure rollers which roll on the support. When treating long and narrow articles such as collars and cuffs, these devices could be combined for instance in such a manner that the brushes would act in the longitudinal, and the pressure rollers in the transverse, direction of the articles. When the table and the article are standing still, the distributing organs, in addition to their rotation, execute also some other working movement, for instance a reciprocating movement, in order to treat as far as possible the whole surface of the article. This working movement could be in the direction of the treatment, or not.

The machine for carrying into effect the process, comprises one or more rotating distributing organs provided above a smooth support, or one or more sets of such organs, as well as a wiping device, all these devices together constituting the working organs. The support could also be constituted by an endless intermittently driven or advanced table, relatively to which when it is standing still, the working organs make a working movement and are vertically adjustable for the purpose of allowing the advance of the table. The working organs can be repeated in the direction of movement of the support at such intervals that in the interval the article treated on one face, can be turned over by hand or by means of an automatic device, for the purpose of treating its other face.

Figure 5:
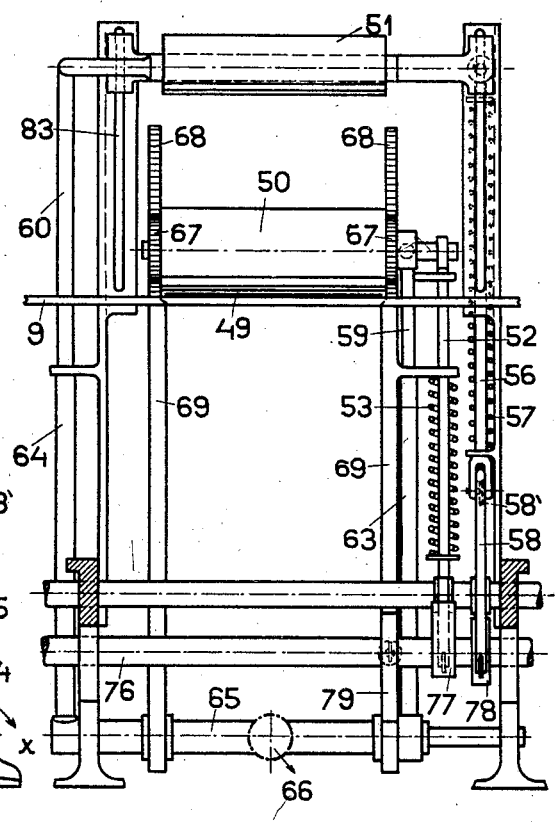
Figure 11:
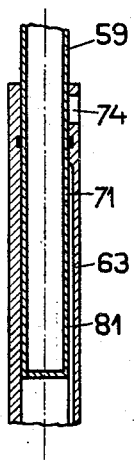
Figure 12:
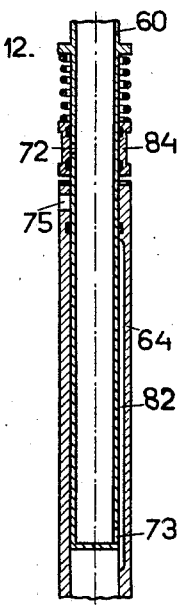

A construction of a machine for carrying out the invention is illustrated by way of example in the accompanying drawings in which Figure 1 shows it in longitudinal section, Figure 2 in plan and Figure 3 in cross-section on line A—B of Figure 1. Figures 4 and 5 show by way of example a construction of an automatic turning-over device for the article, in elevation and side view. Figure 6 shows a collar as an article of washing. Figures 7–10 are detail views and Figures 11, 12 show the air distributing slide valves of the turning over device in section.

In this machine are used tables or plates 1 which are connected by means of joints or articulations 2 to form an endless band, which travels over two drums or pairs of pulleys 3 and 4. The plates are provided with rollers 5 which in the operative upper section of the endless band travel on guide rails 6 and on reaching the drums, engage with bearing recesses 7 of the same. In the inoperative lower section, the plates are guided over supporting rollers 8 with a soft surface. For the change of the movement of the plates from rotary to advancing one or conversely, the articulations 2 could be given a suitable play or (and) the bearings 7 made elastic.

The plates as a rule have a surface which is adapted to the size of the articles to be treated, the said surface, when the machine is more particularly intended for the treatment of collars and cuffs, being made sufficiently great to accommodate on one plate side by side two or more articles placed in the direction of movement of the plates. The plates have a smooth upper surface which is preferably constituted by a top 9 (support) of marble, glass or the like placed on them.

The front portion 10 of the upper section of the endless band is left free and is intended for placing the articles flat. Behind it, are provided, in the direction of movement of the endless band, two sets of rotating distributing organs which treat the articles in different directions and make a working movement also of different directions.

One set 11 comprises several, for instance three, cylindrical brushes 11', 11'', 11''' which treat the articles placed on the fixed smooth support 9, as far as possible throughout the whole of their surface in their longitudinal direction, and therefore in the direction of movement of the endless band (see arrows I in Figure 6). To that end, the brushes are given a quick rotary and reciprocating motion. Moreover, during the introduction of the articles, the brushes must be lifted off from the support in order to prevent the articles from being turned up at the end.

Both drives are taken from a transverse shaft 12 which is continuously driven in a suitable manner from a main shaft. This shaft reciprocates by means of a crank gear 14 a system of say four longitudinal rods 15 connected together, in the direction of movement of the endless band; these rods are rectilinearly guided in the space within the endless band. From the said longitudinal rods start two vertical rods 17 which carry the central cylindrical brush 11'' direct in a short vertical guide, and the two lateral brushes 11' and 11''' by means of arms 19 which are pivoted about 18 and connected by rods 20 to the spindle of the central brush 11''.

The quick rotation of the cylindrical brushes is also produced from the shaft 12 by means of chains 21, 22 or the like driving the wheel 23 on the spindle 18, the rotation of the said wheel being transmitted by means of belts or the like 24 to the three brushes, the chain 22 changes its length only to a slight extent owing to the arrangement of the wheel 25 supported on a fixed part in the centre of the longitudinal movement of the brushes.

The slight raising of the brushes is effected by an automatic direct lifting of the central brush 11'' for instance by means of a cord 26. This lifting movement is transmitted by the guide device 20, 19 to the lateral brushes without their rotary drive being affected. The brushes return to the position in engagement with the support partly by gravity and partly under the action of springs 27.

The driving of the brushes is preferably effected in such a manner that the two outer brushes rotate in opposite directions to each other so as not to affect the flat position of the articles to be treated on the support.

By using several brushes arranged at an acute angle to each other (Figure 7) or helical brushes arranged in opposite directions (Figure 8), it is possible to treat the articles with one and the same set of rotating distributing organs and with the same direction of movement of the organs, simultaneously in different directions. Figure 9 shows by way of example a single distributing organ which can treat the articles simultaneously in different directions. It is provided for the purpose for instance with two sets of helical brushes of opposite directions.

The second set 28 of rotating distributing organs arranged behind the set 11, treats the articles standing still in a direction at right angles to the direction of the first treatment, that is to say at right angles to the direction of movement of the plates (see arrows II in Figure 6). If the width of the articles is sufficient, brushes could be used also for this purpose. As however it is mostly a question of collars and cuffs, that is to say of long and narrow articles, it is advisable, in order to prevent the articles from being detached from the support by this treatment, to use rotating and elastic distributing pressure rollers 28 which are arranged in the longitudinal direction of the endless band and elastically supported in vertical direction in a U-shaped cross frame 29 (Figures 1–3), the journals being controlled by the action of an upper and lower spring 30 or 31 (Figure 10). The pressure rollers have an elastic or yielding pressure surface, for instance constituted by a rubber jacket which is provided with recesses and projections, and during its transverse rolling movement over the article, produces a distribution and a forcing-in of the starch. The drawings show by way of example the pressure surface of the rollers provided with helical grooves which, in the assumed transverse rolling movement of the rollers, treat the articles in the diagonal direction. If, as shown in Figure 2 on the right, several rollers 28 with helical grooves of opposite directions, are used, the articles will be treated by this device in two different diagonal directions. The transverse rolling movement of the pressure rollers is derived from the above mentioned longitudinal rods 15. To that end, the frame 29 is pivoted by means of two lateral arms 32 about one and the same spindle 33, and rollers 34 provided on the said arms, are controlled by wedges 35 or the like, which are provided on the longitudinal rods 15 and impart a positive transverse movement to the frame 29 and therefore to the pressure rollers, the said rollers which are mounted in an elastic manner, rolling on the table and on the linen and treating the latter.

The lifting of the said pressure roller from the support is effected by means of cords 36 with the assistance of an auxiliary device constituted by cords 37 and guide pulleys 38, 39 and intended to lift the rollers in a uniform manner at both ends.

Behind this second set of rotating distributing organs is provided a wiping device 40 which removes from the treated articles standing still, the liquid starch which still remains on their surface. This wiping device is for instance substantially of the same construction as the distributing organ 11. It comprises wiping organs 41 of an absorbent material such as for instance ordinary bath sponges of the required size, which are supported by means of the construction used for the distributing organs 11, by vertical arms 42 which also start from the longitudinal rods 15. Owing to this construction, the wiping organs, the pressure of which could be adjustable, make a reciprocating working movement in the longitudinal direction of the machine. The lifting off of the wiping organs from the support is effected in the manner described for the distributing organs 11, by means of the cord 43. The wiping organs could also rotate, more particularly they could be constituted by rotating wiping rollers similar to the cylindrical brushes 11.

The articles placed at 10 on the supports 9 are consecutively fed by the intermittently driven endless conveyor band, to the two distributing organs 11, 28 and treated by the latter during the time when the conveyor band is standing still, whereupon the wiping device 40 comes into action. During the feeding of the articles under each of the three devices mentioned, the latter are raised and then, with the conveyor band standing still, set down again on the support. The operation of the three cords 26, 36, 43 is effected jointly, for instance by means of a drum 44 or the like (Figure 1) driven from the main shaft, the projections or tappets 45 of the said drum actuating a crank drive 46 in such a manner that it operates a guided plate 47 or the like to which are connected all the cords.

The device described up to now, treats the articles on one side only, whereas it is desirable or necessary to treat them also on the other side. This can be done on a machine with one or more distributing organs, or sets of the same, and with one wiping device for instance with the three working organs 11, 28, 40, by the said working organs 11, 28, 40, taking of the articles treated on one side and placing them, after turning over, at 10 again on the supports 9, whereupon these articles are carried through the machine for the second time.

In the machine shown in the drawings, a second set of the said working organs 11, 28, 40 is however arranged in the longitudinal direction of the machine, the endless band being made of sufficient length, namely at such a distance from the first set as to leave an interval 48 in which the articles can be turned over by hand or by means of an automatic device. In this construction, the articles when removed from the machine, had been treated on both sides, and can be then at once fed into the drying apparatus and finally conveyed to the ironing machine.

A construction of an automatic turning device for the articles of washing is illustrated by way of example in Figures 1 and 2, and more particularly 4 and 5. This device is adapted, as regards its arrangement and construction, for instance for the treatment of a collar 49 (Figure 6) placed in the longitudinal direction of the conveyor band on the smooth support 9.

The turning-over devices comprises two suction-heads 50, 51 arranged above each other. The lower section-head 50 is fastened to a rod 52 which is pressed down by a spring 53 and may be raised by a bell-crank lever 54 by means of a little roller 55 mounted on the said rod 52. The upper suction head 51 is fastened on a rod 56 which is pressed up by the spring 57 and may be lowered by a bell-crank lever 58 by means of a roller 58'. The suction head 50 communicates with the pipe 59 and the suction-head 51 with the pipe 60, both pipes sliding within pipes 63, 64 which open into a main-pipe 65 leading to a vacuum tank 66.

On both sides of the suction head 50 there are provided toothed wheels 67 meshing with fixed racks 68 fastened on rods 69 which may be turned or swung about the axis of the main-pipe 65 in the direction of the arrow $x$. The junction between the pipe 63 and the main-pipe 65 is so that the pipe 63 and therefore the suction-head 50 may be turned together with the racks 68 about the axis of the main pipe 65. This turning-movement is caused by a striking rod 70 making a horizontally reciprocating movement.

The suction-heads are connected to the vacuum tank or to the atmospheric air alternatively. This is effected by apertures 71, 72, 73 in the sliding pipes 59, 60 (Figs. 11, 12) which apertures connect the interior of these pipes or with the apertures 74, 75 of the pipes 63, 64 opening to the atmospheric air, or with the interior of the pipes 63, 64 opening to the vacuum tank. The device is worked by the continually rotating shaft 76, upon which there are mounted three cams 77, 78 and 79. The cams 77 and 78 produce the different movement of the levers 54 and 58, whereas the reciprocating movement of the striking rod 70 is caused by the cam 79, against which this rod is pressed by the spring 80.

The suction head 50 is first set down on the article 49 by the spring 53. At this moment, the connection to the vacuum tank 66 is automatically established, as the pipe 59 is connected with the interior of the pipe 63 by the aperture 71 and the groove 81 (Fig. 11), so that the article is held by the suction head owing to suction. The suction head 50 is then raised by the lever 54 and turned upwards through the racks 68 and toothed wheels 67 about its horizontal axis to 180°. In this position the aperture 71 of the pipe 59 opens into the aperture 74 of the pipe 63 and therefore the suction head 50 will be automatically shut off from the vacuum and connected to the atmospheric air, so that the article will be released. The suction heads 50, 51 finally strike each other and the upper suction head 51 which at that moment is connected with the vacuum, takes over the article. The connection of the suction head 51 to the vacuum tank 66 is effected by the aperture 73 of the pipe 60 (Fig. 12) being connected in this position with the groove 82 leading to the interior of the pipe 64.

The lower suction head 50 then makes a short downward movement, and then, owing to the reciprocating movement of the rod 70, a lateral oscillation in the direction of the arrow $x$ about the axis of the pipe 65, the racks 68 making this oscillation too without any effect being produced. During this oscillation or turning, the suction head 51 descends owing to movement of the lever 58 in its vertical guide 83. At the end of this downward movement, the aperture 72 which is shut off in the upper positions of the suction head 51 by the sliding socket 84, opens into the aperture 75 of the pipe 64, whereas the aperture 73 is below the groove 82 in this moment so that the suction head 51 is shut off from the vacuum and lays the article in turned-over state on the support. The suction head 51 is then raised by the spring 57, the suction head 50 swings back to its position below the suction head 51, and finally the suction head 50 is lowered and turned completely back to its initial position.

The table plates 9, before being used again, must be freed from the starch and other impurities adhering to them. This is preferably done in the lower straight portion of the endless conveyor band, in the neighbourhood of the front drum 3, by means of a rinsing device 61 with water under pressure, and of the brush device 62 preferably constituted by quickly rotating brushes.

I claim:

1. An apparatus for the uniform distribution and working-in of the impregnating medium in wash articles previously impregnated, comprising a smooth rigid support for the articles, sets of rotating distributing organs above said support, said organs being movable in different directions at right angles to each other and coinciding with the direction of length and of width of the articles, means for moving said organs in said directions and a wiping device above the said support.

2. An apparatus for the uniform distribution and working-in of the impregnating medium in wash articles previously impregnated, comprising a movable rigid support for the articles, sets of rotating distributing and wiping organs above the said support, means for moving intermittently the said support with the articles under the said organs, and means for moving these organs to treat the articles during the standstill of the said support.

3. An apparatus for the uniform distribution and working-in of the impregnating medium in wash articles previously impregnated, comprising a smooth rigid support for the articles, sets of rotating distributing and wiping organs for treating the articles consecutively above the said support, the said organs being also adapted to perform a horizontal reciprocating movement, and means for reciprocating said organs.

4. An apparatus for the uniform distribution and working-in of the impregnating medium in wash articles previously impregnated, comprising a smooth rigid support for the articles, rotating and horizontally reciprocating cylindrical brushes above the said support, distributing elastic pressure rollers arranged so as to roll directly on the articles and both being provided with a helically arranged clothing, and absorbent wiping organs above the said support.

5. An apparatus for the uniform distribution and working-in of the impregnating medium in wash articles comprising a movable support consisting of an endless intermittently driven band of connected plates with a smooth upper surface, vertically adjustable distributing and wiping organs, actuating means connected to said organs for imparting a working movement to said organs during the standstill of the band, and means for raising and lowering said organs.

6. An apparatus for the uniform distribution and working-in of the impregnating medium in wash articles previously impregnated comprising a smooth rigid support for the articles, rotating distributing cylindrical brushes and absorbent wiping organs above the said support.

7. An apparatus for the uniform distribution and working-in of the impregnating medium in wash articles previously impregnated, comprising a smooth rigid support for the articles, elastic distributing pressure rollers directly rolling on the article and absorbent wiping organs above the said support.

8. An apparatus for the uniform distribution and working-in of the impregnating medium in wash articles, comprising a smooth rigid support, cylindrical brushes and distributing elastic pressure rollers, both arranged above said support and both being provided with a helically arranged clothing, and absorbent wiping organs above the said support.

9. An apparatus for the uniform distribution and working-in of the impregnating medium in wash articles, comprising a smooth rigid support, distributing rollers above said support, said rollers being arranged obliquely to each other, and absorbent wiping organs above said support.

10. An apparatus for the uniform distribution and working-in of the impregnating medium in wash articles previously impregnated, comprising a movable smooth rigid support, a set of distributing organs above said support, said organs being movable in a plane parallel to said support, means for moving the said organs in said plane of movement, said set of distributing organs including a central organ 11″ adapted to be raised and lowered, a vertically reciprocating organ for raising and lowering said central organ operatively connected thereto, lateral distributing organs 11′, 11‴, rod systems 19, 20 connected to said lateral organs and central organ for raising and lowering said lateral distributing organs and an absorbent wiping device arranged above the said support so as to lie in the path of movement of the wash articles.

11. An apparatus for the uniform distribution and working-in of the impregnating medium in wash articles, comprising a movable smooth rigid support, a set of distributing and wiping organs above said support and a second set equal to the first set, arranged in the direction of movement of the support at such a distance from the first set as to leave an interval or space 48 of a length equal at least to the length of the articles, and means in the space for turning over the articles treated.

12. An apparatus for the uniform distribution and working-in of the impregnating medium in wash articles, comprising a movable smooth rigid support, a set of distributing and wiping organs, a second set equal to the first set, arranged in the direction of movement of the support at such a distance from the first set as to leave an interval or space 48 of a length equal at least to the length of the articles, and an automatic pneumatic turning-over device above said interval or space, comprising two suction heads 50, 51 above each other, means for raising and lowering the said suction heads, means for turning the lower suction head about 180°, means for connecting the two suction heads to a vacuum tank or to the atmospheric air alternatively, and means for turning away the lower suction head out of the path of the upper suction head.

In testimony whereof I have signed my name to this specification.

HANS DENHOF.